United States Patent [19]
Reed et al.

[11] Patent Number: 5,121,701
[45] Date of Patent: Jun. 16, 1992

[54] TRANSPLATING APPARATUS

[75] Inventors: John N. Reed, Flitwick; Ian J. Boddington, Marston Moreteyne, both of England

[73] Assignee: National Research Development Corporation, London, England

[21] Appl. No.: 625,654

[22] Filed: Dec. 12, 1990

[30] Foreign Application Priority Data

Dec. 13, 1989 [GB] United Kingdom ............ 89282124

[51] Int. Cl.$^5$ ............................................ A01C 11/02
[52] U.S. Cl. .................................. 111/105; 111/174; 111/100
[58] Field of Search ............... 111/105, 104, 100, 170, 111/177, 174, 906, 915, 918

[56] References Cited

U.S. PATENT DOCUMENTS

| 3,872,805 | 3/1975 | Kolk et al. | 111/104 |
| 4,290,373 | 9/1981 | Boots et al. | 111/705 |
| 4,899,672 | 2/1990 | Paul | 111/170 |

FOREIGN PATENT DOCUMENTS

| 0210740 | 6/1987 | European Pat. Off. | |
| 2560482 | 9/1985 | France | 111/105 |
| 353800 | 2/1990 | France | 111/100 |
| 8706791 | 11/1987 | PCT Int'l Appl. | 111/105 |
| 869611 | 10/1981 | U.S.S.R. | 111/104 |

Primary Examiner—Dennis L. Taylor
Assistant Examiner—Spencer Warnick
Attorney, Agent, or Firm—Cushman, Darby & Cushman

[57] ABSTRACT

A transplanting apparatus for transplanting plants from free draining matrix trays in which each plant containing cell of each matrix tray is provided with a drainage hole at the bottom of a cell. The transplanting apparatus has a matrix tray rotary supply device, an expulsion/indexing device, a plant catching device, and a planter device. The matrix tray rotary supply device vertically holds and supplies matrix trays to the expulsion/indexing device, and rotates to supply a new matrix tray. The explusion/indexing device moves a supply matrix tray in a row by row movement and expulses one row of plants after the other. The plant catching device catches the expulsed plants and aligns the expulsed plants root end down, and the planter device plants the expulsed aligned plants.

16 Claims, 9 Drawing Sheets

TRANSPLATING APPARATUS

BACKGROUND OF THE INVENTION

The present invention relates to transplanting apparatus and in particular to transplanting apparatus for transplanting plants from free-draining matrix trays i.e. from trays in which each plant-containing cell is provided with a drainage hole at the bottom of the cell. In a typical matrix tray there might be twenty rows of twelve cells each, for example.

Hitherto, these plants have been removed from the matrix trays manually, which is a slow and relatively expensive process.

SUMMARY OF THE INVENTION

An object of the present invention is to provide a system in which plant removal is performed by machine.

According to the present invention, a transplanting apparatus for transplanting plants from free-draining matrix trays as hereinbefore defined, comprises pneumatic plant expulsion means operative to blow plants from the tray cells into respective catching chutes.

The apparatus includes control means adapted to operate the expulsion means automatically.

The expulsion means includes one or more nozzles adapted to engage with the drainage holes in the cells.

Tray support means are provided for holding the trays vertically with the expulsion means on one side and the catching chutes on the other side.

In this last case, the tray support means comprises a rotary support member for a plurality of the matrix trays disposed around a vertical rotation axis of the rotary support member.

Indexing means is provided whereby successive rows of cells in a matrix tray are presented to the expulsion means one row after the other.

In this last case, the indexing means operates by moving the matrix tray in the desired row-by-row movement.

In those embodiments where the expulsion means comprises hole-engaging nozzles and the support means holds the trays in a vertical reference plane, then at least some of the nozzles constitute indexing nozzles mounted for indexing movement in said reference plane and the indexing means includes these indexing nozzles and drive means for driving the indexing nozzles in said indexing movement.

In this last case, the nozzles also include non-indexing nozzles and the drive means is operative to withdraw the non-indexing nozzles from the cell holes to allow said indexing movement of the indexing nozzles and thereafter to engage the non-indexing nozzles in the cell holes to allow withdrawal of the indexing nozzles in readiness for the next said indexing movement.

The one or more catching chutes each comprise a downwardly tapering top hopper portion.

The hopper portion leads into a down tube portion and a constriction occurring at the junction of the two chute portions is effective to catch the leaves of the plant thereby ensuring that the plant leaves the catching chute the right way up i.e. rootball first.

The upper edge of the hopper portion slopes downwardly towards said reference plane.

The catching chute includes flap means operative either to retain the plant in the chute or to controllably discharge the plant therefrom.

The flap means comprises a discrete L-shaped part pivoted about a horizontal axis at the top and with its bottom providing the floor portion of the chute. On a pivotal movement of the L-shaped part about its pivot axis, the floor portion inclines to the horizontal so that the plant is slid along the floor portion by reaction against the chute sidewall in a controlled discharge of the plant from the catching chute.

Alternatively, the flap means comprises a vertical rear face part pivoted about a horizontal axis at the top and with its lower part forming a trap to catch the falling plant against a tapered front chute section. On a rearward pivotal movement of the flap the plant is released from the chute by sliding down the inside front face of the tapered chute section.

Transfer means are provided to move each of the one or more chutes from a plant-catching first location in the apparatus to a plant-releasing second location at which the plant can be discharged from the plant-catching chute, e.g. to a planter assembly.

BRIEF DESCRIPTION OF THE DRAWINGS

Embodiments of the invention will now be described, by way of example only, with reference to the accompanying somewhat diagrammatic drawings in which.

DESCRIPTION OF THE PREFERRED EMBODIMENTS

Although the scope of the invention extends to self-powered transplanters having the characteristics of the present invention, the transplanter illustrated in FIGS. 1 to 8 by way of example, is a mounted machine adapted to be towed by a tractor 4 through the usual three-point linkage 6. Reference numeral 8 indicates the free-draining matrix trays, referred to earlier.

In essence, the illustrated transplanter 10 comprises a pneumatic plant expulsion/indexing system 12 to expel a row of plants from a matrix trap 8 and for moving the trays down row by row in front of the expulsion/indexing system 12, a rotary vertical-tray support 14 adapted to bring each tray in turn before the plant expulsion/indexing system 12, and a string of plant-catching chutes 18 adapted to deliver to a planter unit 20 the plants expelled by the expulsion/indexing system.

Figure 2:
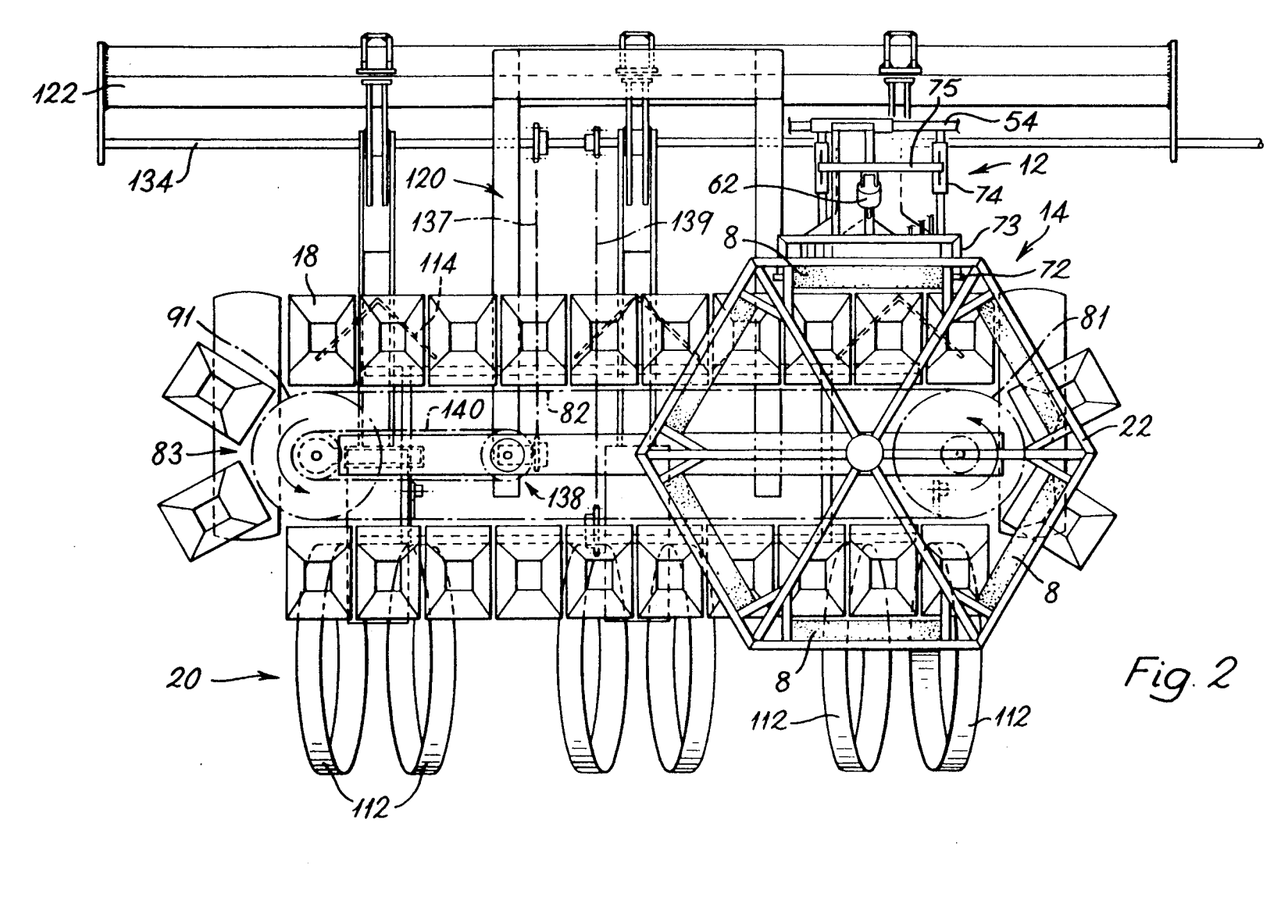
Figure 3:
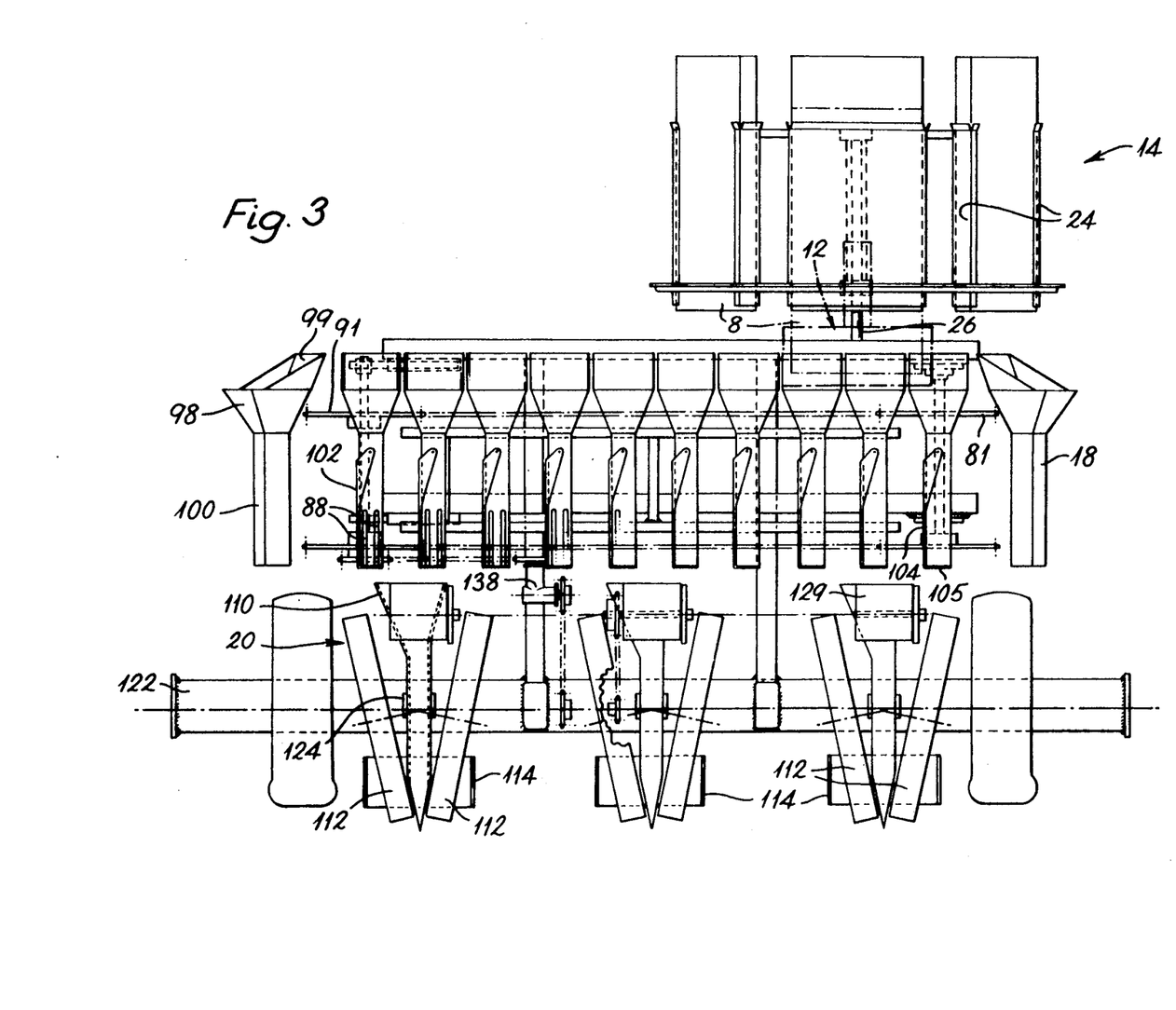

Shown in FIGS. 2 and 3, the rotary trap support 14 comprises a hexagonal-plan rotor cage or "carousel" 22, each side of which is fitted with two vertical tray holders 24 into which full trays 8 can be manually slotted and, if necessary, spring-loaded on to the holder base.

Figure 1:
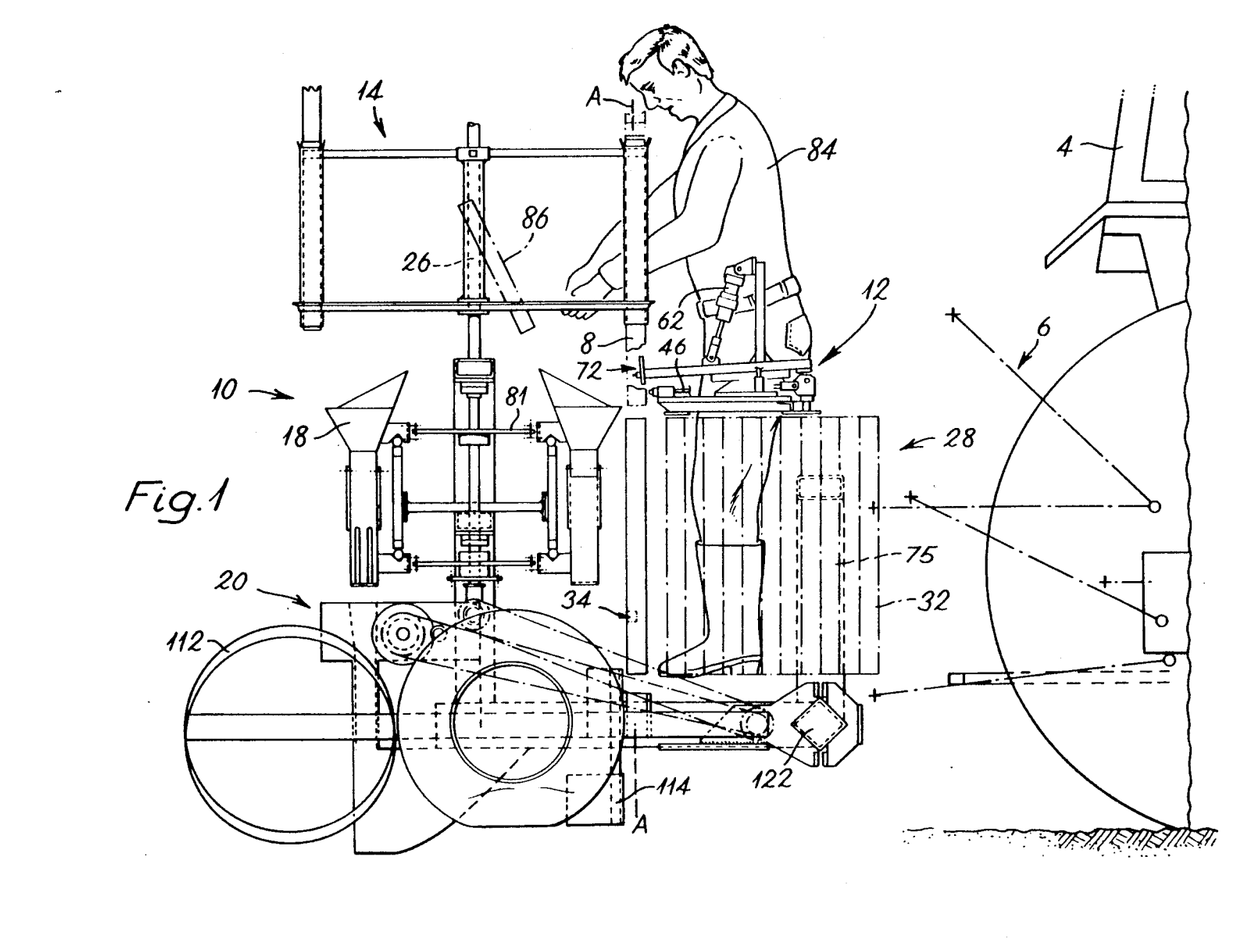
FIGS. 1, 2 and 3 are simplified side, plan and end views of a transplanter according to a preferred embodiment of the invention.

In use, the carousel is driven by a constant force (tensator) spring motor (not shown) in 60° rotations about a central axle 26. This brings successive matrix trays in front of the expulsion/indexing system 12 where they lie in a "reference plane" A—A as shown in FIG. 1.

Once empty, each tray will drop, upright, into a receiving unit 28 where a pneumatic ram (not shown) is automatically activated by a microswitch (not shown) to push the empty tray against a spring loaded back plate 32. There it is latched and the ram returns to its original position.

Conveniently, there will be space in receiving unit 28, for up to twelve empty trays, this corresponding to the number of plants required for planting a typical field length.

Each 60° rotation of the carousel is initiated by momentarily disengaging a pneumatic ram-controlled latch (not shown) which locks the carousel in place while the expulsion/indexing system 12 is operating. The latching pneumatic ram (not shown) is automatically controlled by a microswitch 34 to link the carousel rotations with the indexing of an almost empty tray.

Conveniently, the spring motor is such as to allow up to twenty five 360° rotations of the carousel before the motor needs rewinding.

In variations, the carousel is driven by pneumatics instead of by constant force springs and/or the carousel contains 336 cell trays (14 cells present in each of 24 rows).

Figure 5:
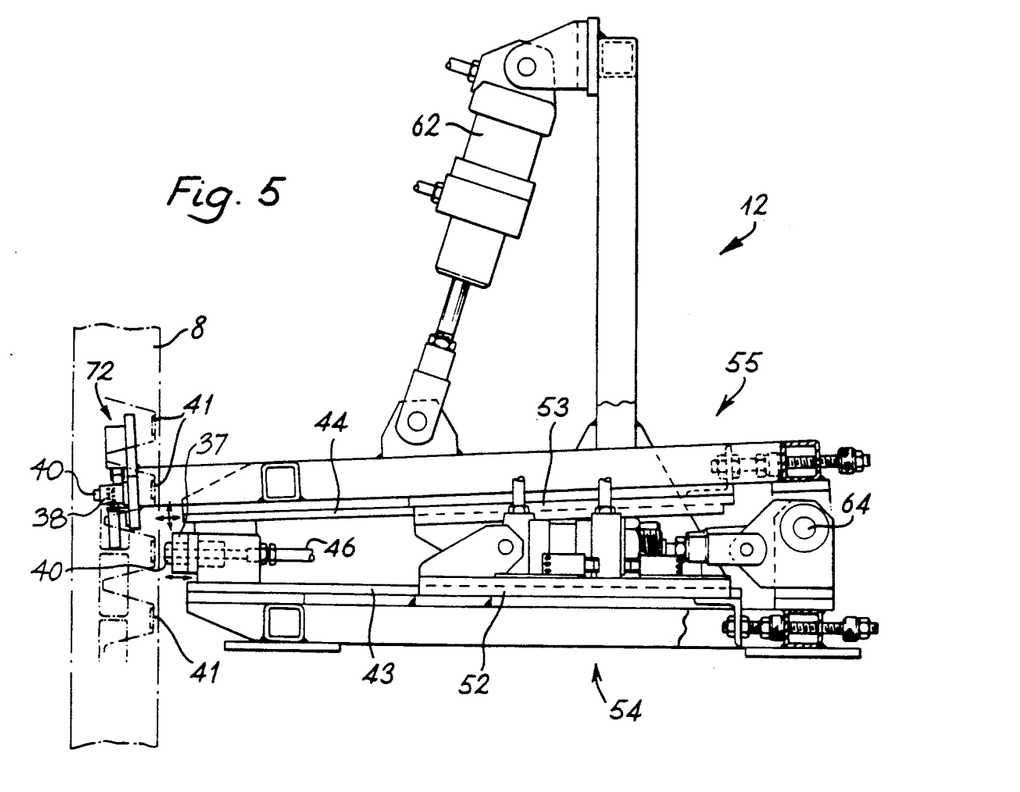
FIGS. 5. 5A and 6 are side, detail and plan views, on larger scales, of the pneumatic expulsion device used in the transplanter.
Figure 5A:
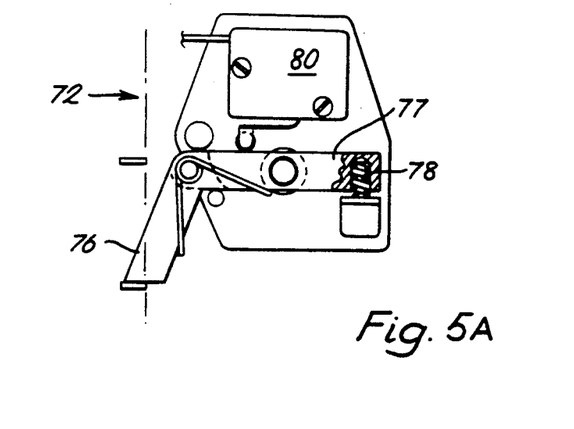
Figure 6:
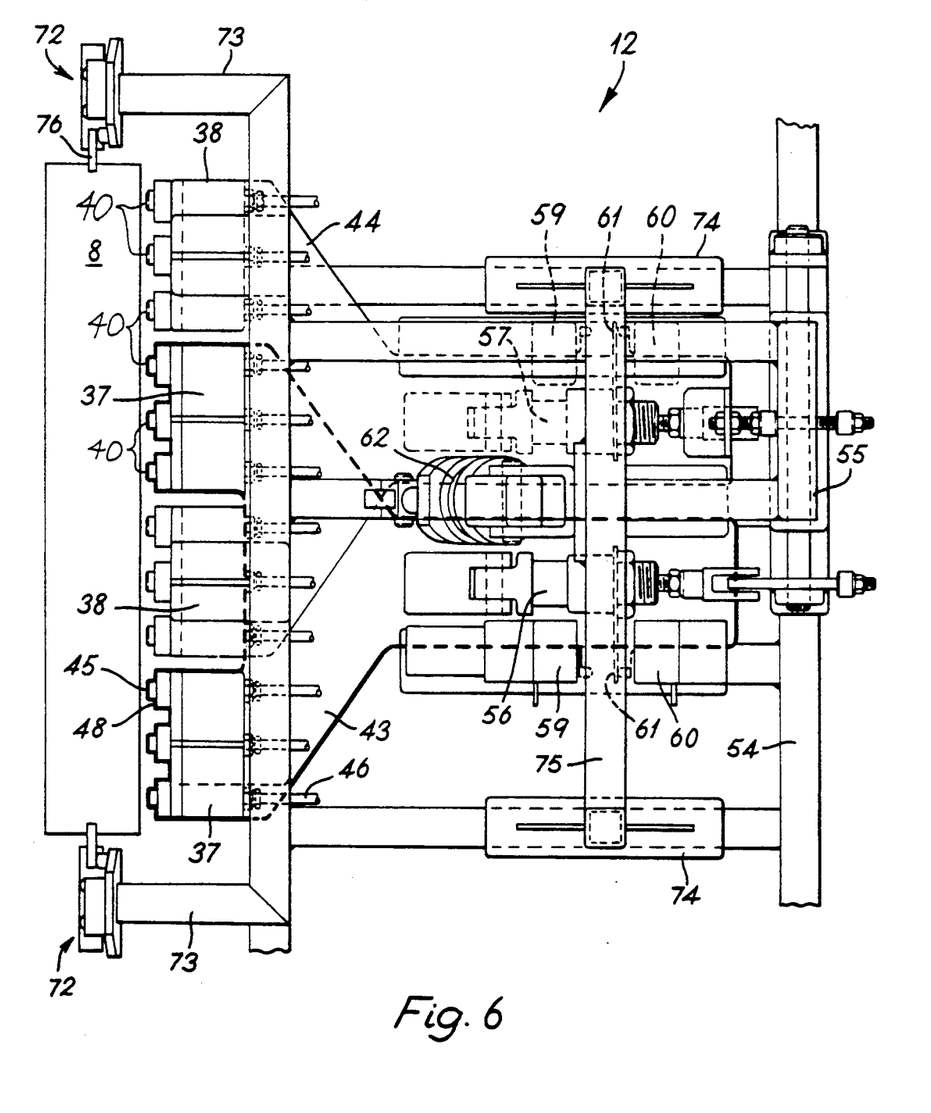
Figure 7:
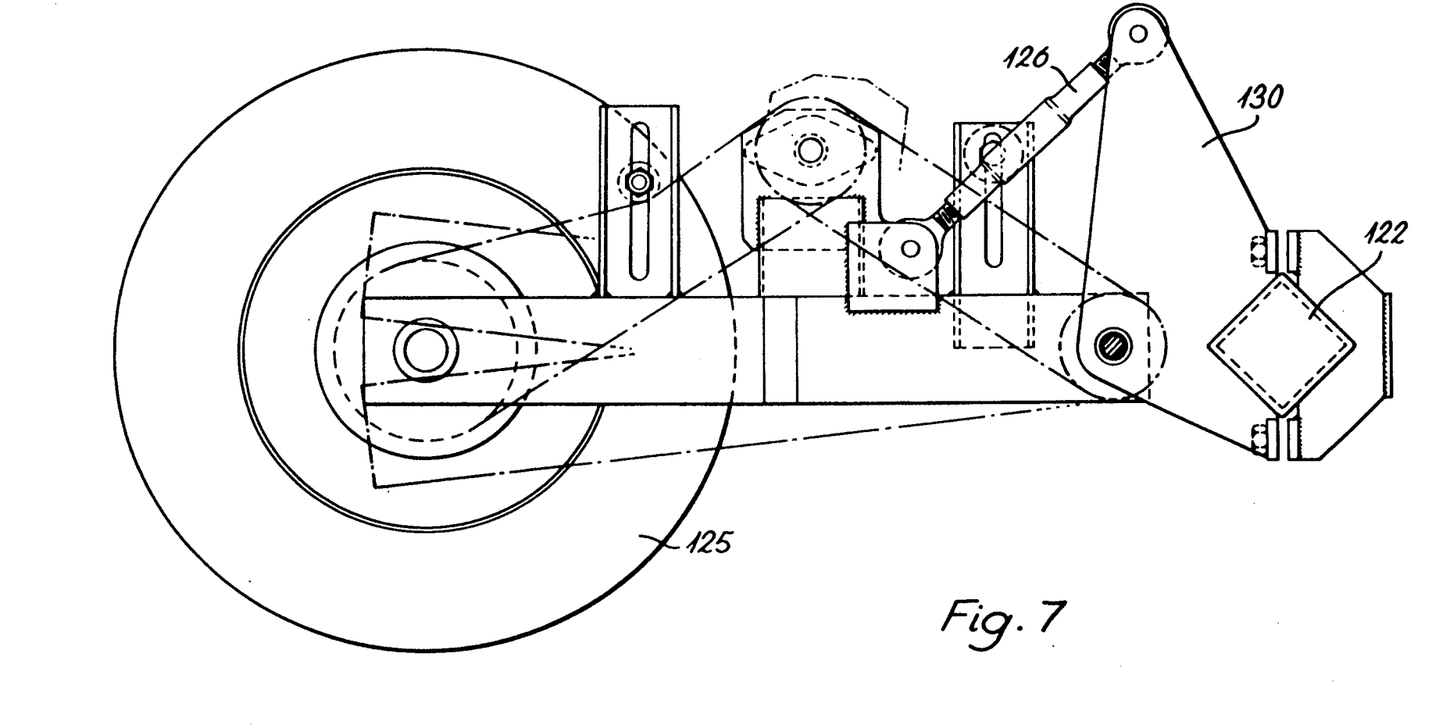
FIGS. 7 and 8 are side and plan views, also on a larger scale, of a ground-wheel drive mechanism used in the transplanter.

FIGS. 5, 5A and 6 show the expulsion/indexing system 12. The expulsion/indexing system 12 comprises two manifold units 37,38 supporting twelve nozzles 40 horizontally spaced apart by the same amount as the matrix holes 41 with which they engage. In variations, other nozzle numbers may be used for different trays.

The nozzles are divided into four groups of three nozzles each, with each group carried by an associated manifold unit 37 or 38.

For reasons that will become clear, the manifold unit 37 associated with the first and third groups of nozzles will be referred to as a non-indexing manifold while the manifold unit 38 associated with the second and fourth groups of nozzles will be referred to as an indexing manifold.

The manifold units 37 and 38 carried on the diverging ends of two Y-shaped support plates 43,44 (as shown in FIG. 6), the manifold unit 37 associated with the first and third groups of nozzles extending upwardly from the support plate 43 so as to be able to interdigitate with the underslung manifold unit 38 associated with the second and fourth groups of nozzles.

Each nozzle 40 includes a 9.5 mm chamfered tube 45 which is fed through a flexible airline 46 from an external pneumatic source (not shown). This latter is programmed to "blow" the various nozzles in a sequence to be described below once the tubes 45 have been engaged in the tray cell drainage hoes 41. Different tube sizes could be used with different tray cell drainage holes.

Reference numeral 48 indicates a resilient sealing washer which is compressed when the tube 40 is inserted into a cell drainage hole in the back of the trays.

The support plates 43,44 are mounted for movement along and parallel to the pair of guide rails 52,53 (shown in FIG. 5) provided by a support frame 54 and a pivoted sub-frame 55.

This movement is effected by pneumatic placement rams 56,57 of approximately 10 mm stroke. Each placement ram operates under the control of two microswitches 59,60 which cooperate with a striker plate 61 to ensure that the ram extension corresponds to either a "nozzle in" or a "nozzle out" position with regard to the cell holes 41.

In addition to this parallel movement, the indexing manifold may also be displaced vertically by using a height-adjustment ram 62 to swing the sub-frame 55 about its pivotal connection 64 to support frame 54.

The purpose of this pivoting movement is to align the indexing nozzles of manifold units 38 successive rows of cell holes in the tray 8. However, as this row-to-row spacing will vary somewhat in practice, it is necessary to positively sense the presence of the cell rows rather than to assume that they will occupy certain positions that can be pre-programmed into the machine's controls.

Accordingly, locating ribs (not shown) are conveniently molded into the side walls of the trays in line with each row of cell holes and these ribs can be engaged by latch units 72 located on two side arms 73 of the sub-frame 55 as will hereinafter be described.

Shown in FIG. 5A, each of the latch units 72 comprises an outwardly-sprung rib-sensing pawl 76 carried at one end of a center-pivoted base member 77, the other end of which is upwardly biased by a captive compression spring 78. Each unit also includes a microswitch 80 with its contact engaged by one side of the base member 77.

Consider now the operation of the expulsion/indexing unit 12 starting from the situation in which all the nozzles are engaged in the bottom row of cell holes.

In this position, (numbering the nozzles sequentially from the bottom of the page to the top of the page in FIG. 6), the indexing manifold 38, has already blown out, plant pairs four and ten, five and eleven, and six and twelve into the passing catching chutes 18 as the final part of the previous indexing cycle. The signal to blow out each pair of plants comes from reed switches (not shown) activated by magnets mounted on a timing shaft or disk which is synchronized to the motion of the catching chutes as they pass behind the reference plane A—A under the control of drive sprocket 81.

Next, the indexing process proper is begun as the non-indexing manifold is operated in similar fashion to blow out in sequence, plant pairs one and seven, two and eight, and three and nine. While this is happening, the ram 57 withdraws the indexing manifold nozzles from the tray 8 and ram 62 moves them up by a preset amount equal to more than one row-to-row pitch but less than two.

As the sub-frame 55 pivots up with the indexing manifold during this latter motion, the pawls 76 in latch units 72 will ride over the tray ribs for the next cell row to be evacuated. However, before arriving at the ribs for the row after that, the indexing manifold will reach the limit of its upward travel and the ram 62 will begin to extend and lower subframe 55.

The immediate effect of extending ram 62 is to pivot the sub-frame 55 downwardly (substantially without resistance) until the pawls 76 abut with the tray ribs over which they have just passed. This brings the indexing manifold nozzles exactly oppositely the second row of cell holes. At this point, the upward pressure exerted on the pawl 76 by the tray rib, will operate microswitch 80 to signal the ram 57 to extend and push the indexing nozzles into the adjacent cell holes of the second row of holes in the tray.

Thus the nozzles of the non-indexing manifold 37 are now engaged in the cell holes 41 of the first row while those of the indexing manifold 38 are engaged in the cell holes 41 of the second row.

When the parallel extension of ram 57 is terminated by the associated microswitch 59 engaging the striker plate 61, the microswitch signals the non-indexing nozzles to withdraw from the cell holes. This frees the tray 8 for further downward movement and the ram 62 resumes its expansion to drag the tray down by one pitch when further expansion of the ram is inhibited by a suitable microswitch (not shown). The same switch signals the non-indexing nozzles to extend into the second row.

Both during the downward displacement of the tray 8 and after it has reached its lower limit, the indexing manifold will blow, in sequence, plant pairs four and ten, five and eleven, and six and twelve.

Thus at this point, the nozzles of both manifolds 37,38 are engaged in the back of the same (second) row of the matrix tray and the indexing/plant-expulsion sequence above described can be repeated for this and subsequent rows.

A few rows before the active tray is completely emptied, the active tray actuates a microswitch 34 signalling the carousel to turn 60°. A pneumatic ram then releases a new tray on top of the active tray in readiness for indexing.

Turning now to FIGS. 2 and 3, the operation of the plant catching chutes 18 will be described. The chutes 18 are connected together, by chain 82 to form a conveyor 83. The automatic expulsion/indexing system 12 will take up half the width of the transplanter leaving the other half free for an operator 84 to prepare plants. The operator will have his own tray of plants 86 for this purpose and he will also periodically replenish the carousel 22 with six new trays of plants, possibly while the transplanter is still moving.

The catching chutes have been designed, with slots 88 in their lower ends so that the operator can see if the chute lacks a plant, in which case he will manually deposit one there from his own supply.

After the catching chutes have received a plant, either automatically or manually, they are conveyed to the left hand side of the machine (as viewed in FIG. 2) where they pass around conveyor tensioning sprockets 81,91 before being passed over the three planter units 20.

The features of the catching chutes have been developed to catch the air-ejected plants, to turn the plant upright, to allow the operator to see if a plant is present or not, and to provide a reliable release mechanism for the plant.

As will be seen from FIG. 3, each chute comprises a downwardly tapering hopper section 98 the upper edge of which will slope downwardly towards the reference plane A—A when the chute is in a plant-catching position so as to provide a back plate 99 against which plants can be blown from the matrix tray.

As the plants rebound off the hopper back plate, they can be in virtually any orientation and it is a feature of the chutes that the catching hopper is fitted with a down tube 100 which produces a constriction at the hopper/tube shape transition. This constriction catches the plant leaves and thereby causes the plant to be rotated upright. The down-tube has to be of sufficient length to stabilise the orientation of the plants.

Figure 4:
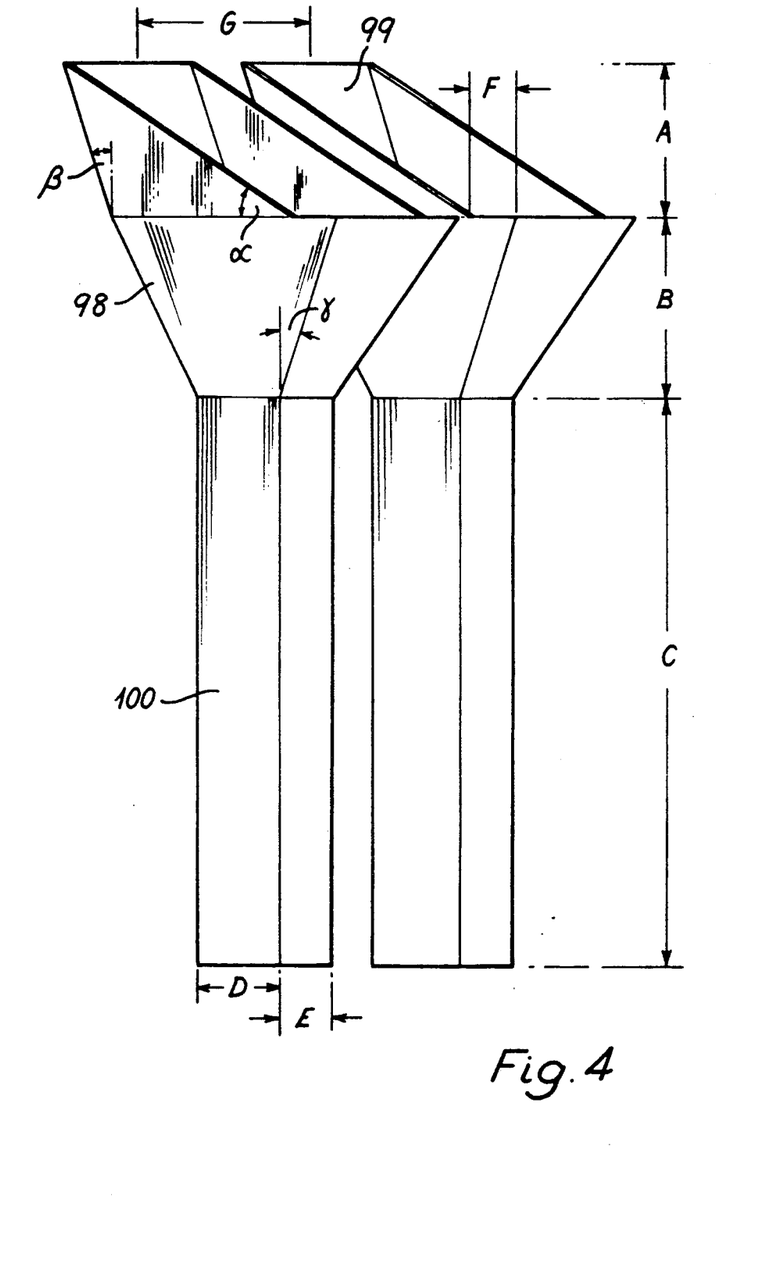
FIG. 4 is a simplified perspective view, on a larger scale, of two of the catching chutes used in the apparatus.

With reference to FIG. 4, typical dimensions for the illustrated chutes are A=100-150 mm, B=85-135 mm, C=300-350 mm, D=70 mm (depends on plant size), E=65 mm (depends on plant size), F=15-35 mm, G=165 mm (i.e. 0.5 times the tray width), and the horizontal separation of the catching chute from the adjacent vertical surface of the tray is 5-15 mm at their region of closest approach. The top edge of back plate 99 measured parallel to dimension G is 153 mm while the top edge of section 98 (containing dimension F) is 175 mm in length.

Regarding the inclinations of the various parts, angle $\alpha$ lies in the range 20°-35°, angle $\beta$ lies in the range 10°-35°, and angle $\gamma$ lies in the range 20°-40°.

It might be desirable to have catching chutes of different dimensions from these if a different tray/plant size system is used. The basic shape requirements would, however, remain essentially the same.

Although not shown in the simplified representation of FIG. 4, the down tubes 100 of the catching chutes are each fitted with a top-pivoted L-shaped flap 102 (FIG. 3) providing the base portion 105 of the chute. When the chutes 18 are in one of the plant release locations over the planters 20, this flap is swung out to one side at about 15° by the action of a flap-mounted lug (not shown) which contacts a cam-plate as the catching chute moves over the planters 20. The plant is pushed off the base portion by the chute sidewall. Another advantage of this arrangement, is that the flap does not require space below the catching chute in order to open.

An alternative design of the FIG. 4 chute is shown in FIG. 9. This differs at its lower end from the earlier design in a number of ways.

Figures 9A, 9B:
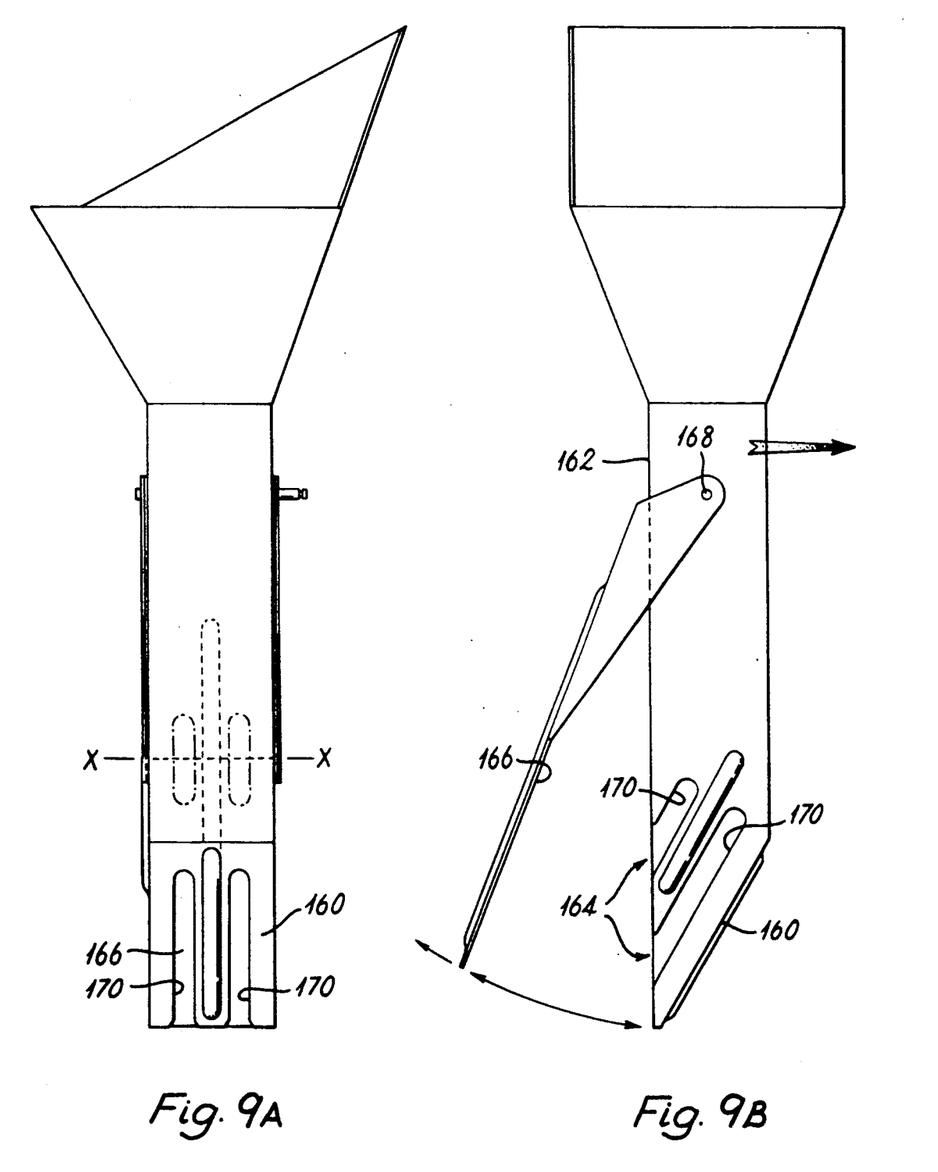
FIGS. 9A and 9B (collectively referred to as "FIG. 9") are respectively end and side views (drawn to scale) of an alternative design of catcher chute to those shown in FIG. 4.

Firstly, the FIG. 9 chute has a closed end 160 and this inclines at 30° to the vertical when seen from the side (as in FIG. 9B). Although the angle of inclination is not critical, a value within the range 25°-35° to the vertical is preferred.

The rear face 162 of the chute terminates at X—X (FIG. 9A). Below this, the discharge opening 164 is either closed (FIG. 9A) or exposed (FIG. 9B) by the hinged flap 166, depending on its orientation about top pivot 168.

One side, and bottom, and optionally also the rear and front faces of the chute are provided with observation slots so that it can be seen whether or not a plant is present in the chute. In addition, these slots reduce friction between plant and chute. Strengthening ribs may also be provided as indicated.

It will be noted that, whereas in the FIG. 4 chute, the triangular-shaped wall section containing the angles $\alpha$ and $\beta$ comprises a trailing first wall section which is associated with a similarly shaped leading second wall section on the other side of the chute entrance, in the modification of FIG. 9, the leading triangular wall section is absent. A similar modification may be made to the FIG. 4 chutes, if desired.

In use of the FIG. 9 chute, as the plant drops from the top of the chute it falls into the tapering space between fixed, angled front end face 160 of the chute and the vertical rear face in part provided by the flap 166. This forces the plant to remain at all times upright. To release the plant, flap 166 is pivoted rearwards and the plant slides down face 160 and into the associated transplanter unit.

It should be noted that the size of plants able to be handled by the transplanter of which the chutes form a part, is not solely determined by the chutes but is also limited by the ejection and conveying systems employed in the machine.

In more detail, numbering the planter units from left-to-right as viewed in FIG. 3, each of the twenty-four plant catching chutes 18 is associated with one of the three planter units 20 such that if one particular chute feeds planter one, say, then the following chute will feed planter two, the chute after that will feed planter three and then the process repeats with the next chute feeding planter one, the chute after that feeding planter two etc.

In alternative embodiments, there are thirty or thirty six chutes 18 (depending on the row widths required).

To reduce the likelihood of blockages with large, strong, leggy or bushy plants the planter chutes 110 are generously dimensioned. Being wider at their upper ends than is usual with conventional planter equipment, they increase the target drop area for plants released from the chutes 18.

Typically, the upper (hopper) section of the planter chutes 110 will have a rectangular catching mouth of dimensions 120 to 150 mm in the direction of transplanter motion and 175 to 225 mm widthwise. The hopper section then tapers over a height dimension of 150 to 250 mm to a 60 to 70 mm square downtube section discharging between press rolls 112 preceded by V-form plough shares 114.

Turning now to the constructional details of the machine, the main frame 75 is be made of rolled hollow section and will be adaptable for different categories of three point linkages.

The catching chute conveyor, and carousel assembly etc. are mounted on a ladder frame structure supported by a pair of braced forks 120 (FIG. 2) extending back from a main frame cross beam 122.

The planter units 20 are each supported from cross beam 122 by a pivoted arm 124 so that angular adjustments of the ground wheel 125 by the turnbuckle 126 (FIG. 7) to vary the operating depth of the equipment and movement over individual undulations will have no effect on the chain drive 139 to the planter kicker units. In addition, both the planter-unit arm 124 and the wheel arm support 130 (FIG. 7) may be slid along the beam 122 so that inter-row spacings may be altered.

Clearly, for optimum efficiency, the transplanter of the present invention will require exactly co-ordinated timing of tray indexing, plant blowing, catching chute conveyor movement and planter unit kickers and this is provided by timing all of these actions relative to a main layshaft 134 driven from landwheels 125.

Accordingly, the catching chute conveyor 82 is driven off the layshaft 134 via a chain and sprocket connection 137 and a right angle gearbox 138 and chain transmission 140. In a variation, the gearbox 138 etc. are repositioned to take the drive to the righthand side of the machine, rather than to the left as illustrated.

With respect to the planter units kicker mechanism 129, rather than providing separate chain drives, only the center unit will take its drive from the main layshaft via chain and sprocket connection 139 and the two outside units will be driven through a telescopic shaft from the centre unit. This will allow convenient change of row widths without having to slide sprockets along shafts etc.

In an alternative arrangement (not shown), the kicker units (which may be of conventional design) are each pneumatically operated and activated by the control system from a common drive instead of being driven by the transplanter's land wheels. The diameter of the press wheels could be smaller so that the overall width of each planter can be made less and the minimum row spacing can be correspondingly reduced. In addition, this new arrangement allows the timing of the kicker units to be maintained at all times (even when an obstructional jam occurs in a kicker unit). Further, it adds flexibility to the operational speed and timing of the kicker units. Lastly, by removing the telescopic drives between each planter unit required when they are driven from the transplanter's land wheels, the new arrangement increases the range of available row widths.

A slip clutch is fitted to the center unit drive sprocket as this will be useful in adjusting the timing of the kicker action of all three units at once, as well as for overload protection.

Figure 8:
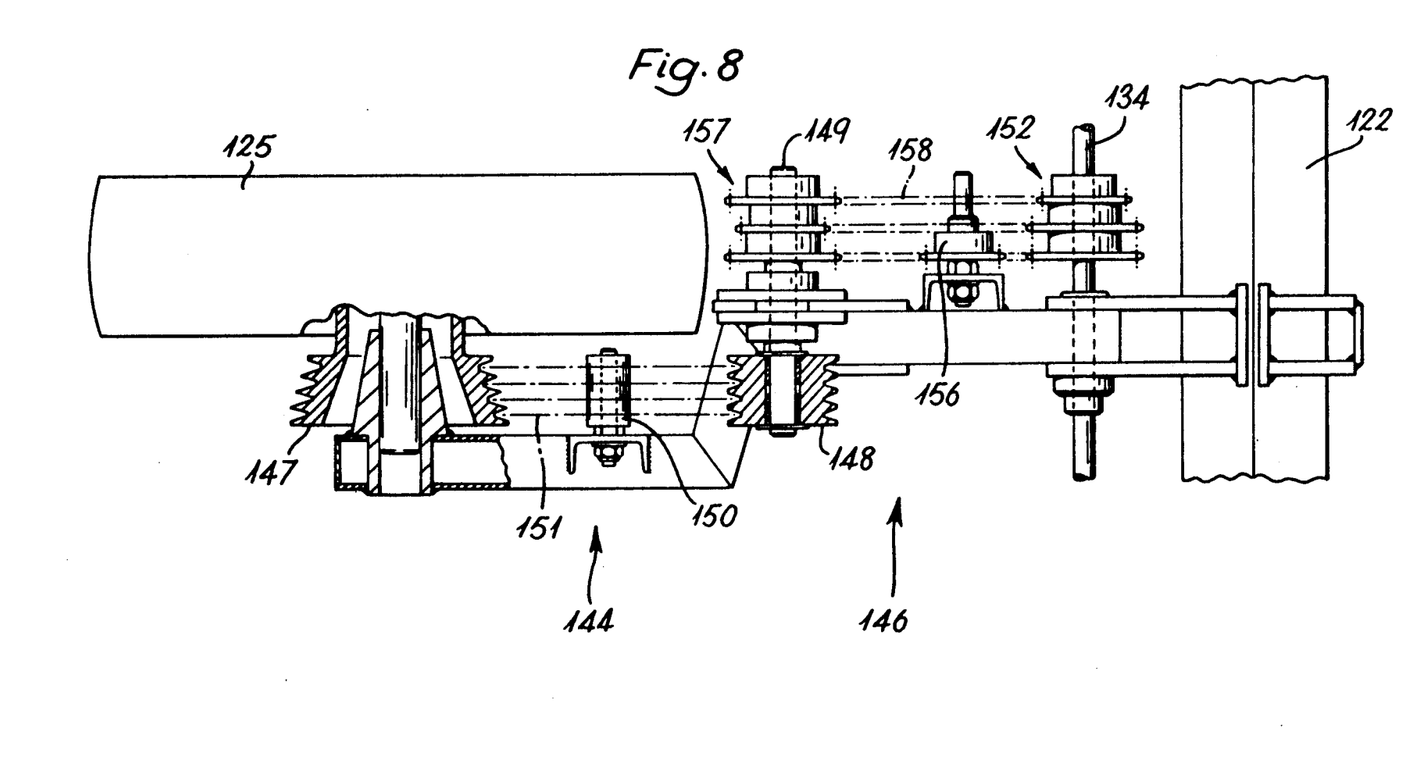

Shown in FIG. 8, to allow for different plant spacings, the speed of the layshaft 134, relative to ground speed, is made adjustable by means of adjustable pulley and chain drive systems 144,146.

In the pulley system, for example, adjustment is by linking an appropriate section of a stepped pulley 147 on the ground wheel hub with the desired one of a number of corresponding pulleys 148 on an intermediate shaft 149. Reference numeral 150 indicates a tensioner for the drive belt 151.

Alternatively, or additionally, different plant spacings may be effected using the chain drive system 146 by linking a chosen one of a set of sprockets 157 on shaft 149 to an appropriate sprocket from a corresponding set of sprockets 152 on the main layshaft 134. Reference numeral 156 indicates an appropriate axially displaceable tensioner sprocket for the chain 158.

It will be seen that moving the chain 158 allows the relative sizes of the three pairs of sprockets shared between the two shafts 149,134 to provide three different gear ratios between the two shafts (FIG. 8).

A freewheeling device is fitted to the wheel arm pulley layshaft 149 to allow the machine to reverse without damaging the transmissions through back driving.

For the pneumatic system, a seven bar compressor system may be incorporated. This will have a nominal capacity of up to 12 cu ft/min flow to provide a 7-9 cu ft/min air curtain at 2 bar, if required, and a 3 cu ft/min, 5 bar supply for plant ejection, and 7 bar for the tray indexing cylinders, carousel cylinders and tray storage cylinder. Conveniently, the compressor may be powered by the tractor pto shaft via a speed up belt drive.

For the electrical system, a 12 volt DC, tractor-powered electrical system may be used. This system will time the blowing of plants from the tray into the boxes and control the tray indexing and carousel movement.

During plant blowing, the plants will be blown out in pairs as hereinbefore described. The signal to blow a particular pair will come from a magnetic reed switch. This will be activated by a magnet attached to a rotating timing shaft or disc which is synchronized to the movement of the conveyor. In total, there will be six such magnets arranged around the timing shaft which will trigger six reed switches, each of which controls one of six solenoid blowing valves timed to eject plants into pairs of consecutive catching chutes.

In a variation, the magnetic reed switch is instead mounted on structure opposite the tray blowing position. A magnet attached to one of the target pair catching chutes, will actuate a switch as it passes, in close proximity, due to the conveyor movement. The next pair of catching chutes will trigger a second reed switch and so on. In total there will be twelve magnets and six reed switches to cater for all twenty four boxes and twelve tray cell positions. Each reed switch therefore controls the firing of one of the six solenoid air blowing valves.

The signal from every third pair of carrying chutes will be used to control the expulsion/indexing system 12 described earlier. As the tray indexes down, it eventually triggers a microswitch to instruct the carousel to rotate one sixth of a turn to supply a new tray.

For initial start-up, an electrical override system may be incorporated, to allow the manifold system to be retracted, to load the first tray. It will also allow the system to be reset should a fault occur.

An air curtain may be provided underneath the row of plants about to be ejected, for the purposes of assisting leaf and plant ejection control.

We claim:

1. A transplanting apparatus for transplanting plants from free draining matrix trays in which each plant containing cell of each matrix tray is provided with a drainage hole at the bottom of the cell, said transplanting apparatus comprising:
   expulsion/indexing means for moving a matrix tray in a desired row by row movement and expulsing one row of plants after the other;
   plant catching means for catching said expulsed plant and aligning said expulsed plants root end down; and
   planter means for planting said expulsed plants aligned by said plant catching means.

2. A transplanting apparatus according to claim 1, further comprising matrix tray supply means for supplying said expulsion/indexing means with a matrix tray.

3. A transplanting apparatus according to claim 1, wherein said expulsion/indexing means comprises:
   a plurality of nozzles for blowing air to expel said plants, said plurality of nozzles divided into an indexing group of nozzles and a non-indexing group of nozzles;
   indexing and non-indexing engagement means for moving said indexing and non-indexing nozzles into and out of drainage holes of a row of cells of a matrix tray;
   height adjustment means for raising said indexing nozzles up to a second row of cells in a matrix tray after said indexing engagement means withdraws said indexing nozzles from drainage holes of a first row of cells, said indexing engagement means then moves said indexing nozzles into drainage holes of said second row of cells of said matrix tray and said non-indexing engagement means withdraws said non-indexing nozzles from said first row of cells, and said height adjustment means lowers said indexing nozzles to drag said matrix tray downward and align said drainage holes of said second row of cells with said non-indexing nozzles so that said non-indexing nozzles may move into said drainage holes of said second row of cells; and
   control means for causing said indexing nozzles and non-indexing nozzles to blow air and expel plants in a row of cells.

4. A transplanting apparatus according to claim 1, wherein said plant catching means comprises:
   a plurality of chutes for catching said expulsed plants and aligning said expulsed plants root end down; and
   conveyor means for conveying said chutes from a plant expulsion receiving position to said planter means.

5. A transplanting apparatus according to claim 4, wherein each chute of said plant catching means comprises:
   a back plate which rebounds an expulsed plant;
   a catching hopper connected to said back plate for catching a rebounding expulsed plant; and
   a constriction tube connected to a bottom of said catching hopper for aligning said expulsed plant root end down.

6. A transplanting apparatus according to claim 5, wherein said planter means comprises planter chutes having larger catching hoppers than said chutes of said plant catching means.

7. A transplanting apparatus according to claim 5, wherein each chute of said plant catching means further comprises a top pivoted L shape flap acting as a base portion of said constriction tube, said flap pivoting to open said constriction tube and deposit said expulsed plant in said planter means.

8. A transplanting apparatus according to claim 2, wherein said matrix tray supply means comprises a rotary support member for vertically holding a plurality of matrix trays, said rotary support member holding a matrix tray with the expulsion/indexing means on a drainage hole side of said matrix tray and said plant catching means on an opposite side, and said rotary support member rotating to supply a new matrix tray to said expulsion/indexing means.

9. A transplanting apparatus for transplanting plants from free draining matrix trays in which each plant containing cell of each matrix tray is provided with a drainage hole at the bottom of the cell, said transplanting apparatus comprising:
   matrix tray rotary supply means for vertically holding and supplying a plurality of matrix trays, and said matrix tray rotary supply means rotating to supply a new matrix tray;
   expulsion means for expulsing plants from plant containing cells of a supplied matrix tray;
   plant catching means for catching said expulsed plant and aligning said expulsed plants root end down; and
   planter means for planting said expulsed plants aligned by said plant catching means.

10. A transplanting apparatus according to claim 9, wherein said expulsion means further comprises an indexing means for moving a matrix tray in a desired row by row movement.

11. A transplanting apparatus according to claim 10 wherein said expulsion means and indexing means comprise:
   a plurality of nozzles for blowing air to expel said plants, said plurality of nozzles divided into an indexing group of nozzles and a non-indexing group of nozzles;
   indexing and non-indexing engagement means for moving said indexing and non-indexing nozzles into and out of drainage holes of a row of cells of a matrix tray;

height adjustment means for raising said indexing nozzles up to a second row of cells in a matrix tray after said indexing engagement means withdraws said indexing nozzles from drainage holes of a first row of cells, said indexing engagement means then moves said indexing nozzles into drainage holes of said second row of cells of said matrix tray and said non-indexing engagement means withdraws said non-indexing nozzles from said first row of cells, and said height adjustment means lowers said indexing nozzles to drag said matrix tray downward and align said drainage holes of said second row of cells with said non-indexing nozzles so that said non-indexing nozzle may move into said drainage holes of said second row of cells; and control means for causing said indexing nozzles and non-indexing nozzles to blow air and expel plants in a row of cells.

12. A transplanting apparatus according to claim 9, wherein said plant catching means comprises:

a plurality of chutes for catching said expulsed plants and aligning said expulsed plants root end down; and conveyor means for conveying said chutes from a plant expulsion receiving position to said planter means.

13. A transplanting apparatus according to claim 12, wherein each chute of said plant catching means comprises:

a back plate which rebounds an expulsed plant;

a catching hopper connected to said back plate for catching a rebounding expulsed plant; and a constriction tube connected to a bottom of said catching hopper for aligning said expulsed plant root end down.

14. A transplanting apparatus according to claim 13, wherein said planter means comprises planter chutes having larger catching hoppers than said chutes of said plant catching means.

15. A transplanting apparatus according to claim 13, wherein each chute of said plant catching means further comprises a top pivoted L shape flap acting as a base portion of said constriction tube, said flap pivoting to open said constriction tube and deposit said expulsed plant in said planter means.

16. A transplanting apparatus for transplanting plants from free draining matrix trays in which each plant containing cell of each matrix tray is provided with a drainage hole at the bottom of said cell, said transplanting apparatus comprising:

matrix tray rotary supply means for vertically holding and supplying a plurality of matrix trays, and said matrix tray rotary supply means rotating to supply a new matrix tray;

expulsion/indexing means for moving a supplied matrix tray in a row by row movement and expulsing one row of plants after the other;

plant catching means for catching said expulsed plant and aligning said expulsed plants root end down; and planter means for planting said expulsed plants aligned by said plant catching means.

* * * * *

UNITED STATES PATENT AND TRADEMARK OFFICE
CERTIFICATE OF CORRECTION

PATENT NO. : 5,121,701
DATED : June 16, 1992
INVENTOR(S) : REED, et al.

It is certified that error appears in the above-identified patent and that said Letters Patent is hereby corrected as shown below:

Col. 2, line 57, change "trap" to -- tray --;
       line 64, change "trap" to -- tray --.

Col. 3, line 47, after "38" insert -- are --;
       line 59, change "hoes" to -- holes --.

Col. 4, line 13, after "38" insert -- with --.

Col. 9, line 33, change "expulsed plant" to -- expulsed plants --;
       line 44, after "nozzles" insert -- being --.

Col. 10, line 16, change "expulsed plant" to -- expulsed plants --;
       line 62, after "nozzles" insert -- being --.

Signed and Sealed this

Twelfth Day of October, 1993

Attest:

BRUCE LEHMAN

Attesting Officer     Commissioner of Patents and Trademarks